United States Patent
Won et al.

(10) Patent No.: US 9,135,256 B2
(45) Date of Patent: Sep. 15, 2015

(54) METHOD FOR SEARCHING CONTENT

(75) Inventors: Joon-Ho Won, Suwon-si (KR);
Chul-Min Choi, Seoul (KR); Eun-Hye Lee, Seoul (KR); Soo-Hyun Lee, Seoul (KR); Byeong-Cheol Hwang, Seoul (KR); Sang-Woo Han, Gunpo-si (KR); Se-Jin Kwak, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 797 days.

(21) Appl. No.: 12/975,272

(22) Filed: Dec. 21, 2010

(65) Prior Publication Data

US 2011/0154250 A1   Jun. 23, 2011

(30) Foreign Application Priority Data

Dec. 23, 2009   (KR) .................. 10-2009-0129923

(51) Int. Cl.
*G06F 17/30* (2006.01)
(52) U.S. Cl.
CPC .... *G06F 17/30038* (2013.01); *G06F 17/30061* (2013.01)
(58) Field of Classification Search
CPC ................ G06F 17/30061; G06F 17/30058
USPC ................................................. 715/783, 727
See application file for complete search history.

(56) References Cited

U.S. PATENT DOCUMENTS

| | | | |
|---|---|---|---|
| 6,948,123 B2 * | 9/2005 | Endou et al. .................. | 715/700 |
| 7,073,130 B2 * | 7/2006 | Novak et al. .................. | 715/744 |
| 7,320,109 B1 * | 1/2008 | Zeevi et al. .................... | 715/763 |
| 7,627,820 B2 * | 12/2009 | Trepess et al. ................ | 715/700 |
| 7,669,143 B2 * | 2/2010 | Shigekusa .................... | 715/830 |
| 7,921,369 B2 * | 4/2011 | Bill .............................. | 715/753 |
| 2003/0050058 A1 * | 3/2003 | Walsh et al. .................. | 455/426 |
| 2004/0237105 A1 | 11/2004 | Ha | |
| 2006/0202994 A1 | 9/2006 | Chevallier et al. | |
| 2007/0085840 A1 * | 4/2007 | Asaka et al. .................. | 345/173 |
| 2007/0136348 A1 | 6/2007 | Uittenbogaard | |
| 2007/0172131 A1 * | 7/2007 | Chosokabe .................. | 382/224 |
| 2007/0233726 A1 * | 10/2007 | Torrens et al. ............... | 707/102 |
| 2007/0247794 A1 * | 10/2007 | Jaffe et al. .................... | 361/681 |

(Continued)

FOREIGN PATENT DOCUMENTS

| | | |
|---|---|---|
| CN | 1871608 A | 11/2006 |
| FR | 2 857 112 A1 | 1/2005 |

(Continued)

OTHER PUBLICATIONS

Cnet Editors' Review Apple iTunes 7 Sep. 15, 2006 6 pages.*

(Continued)

*Primary Examiner* — Andrea Long
(74) *Attorney, Agent, or Firm* — Jefferson IP Law, LLP

(57) ABSTRACT

A content searching method for enabling a user to directly search for desired contents is provided. The content searching method includes displaying a location of a cell including a content being executed in a distribution map, which displays a plurality of cells divided according to a distribution axis, and when a search button is input, redistributing and displaying a location of the cell including the content being executed in a distribution map, which displays a plurality of cells in a changed skin screen depending on a distribution axis having a changed keyword.

20 Claims, 5 Drawing Sheets
(2 of 5 Drawing Sheet(s) Filed in Color)

(56) References Cited

U.S. PATENT DOCUMENTS

| | | | |
|---|---|---|---|
| 2007/0271524 A1* | 11/2007 | Chiu et al. | 715/767 |
| 2008/0005688 A1* | 1/2008 | Najdenovski | 715/765 |
| 2008/0148176 A1 | 6/2008 | Mita | |
| 2008/0168022 A1* | 7/2008 | Benyamin | 706/62 |
| 2008/0189656 A1* | 8/2008 | Abanami et al. | 715/810 |
| 2008/0209349 A1* | 8/2008 | Macadaan et al. | 715/762 |
| 2008/0243803 A1 | 10/2008 | Kobayashi et al. | |
| 2008/0307343 A1* | 12/2008 | Robert et al. | 715/765 |
| 2009/0158214 A1* | 6/2009 | Arnold et al. | 715/830 |
| 2009/0216767 A1* | 8/2009 | Kotro et al. | 707/7 |
| 2009/0300004 A1 | 12/2009 | Tokashiki et al. | |
| 2011/0173264 A1* | 7/2011 | Kelly | 709/205 |

FOREIGN PATENT DOCUMENTS

| | | |
|---|---|---|
| JP | 09-218878 A | 8/1997 |
| JP | 10-289253 A | 10/1998 |
| JP | 2004-259040 A | 9/2004 |
| JP | 2004-350269 A | 12/2004 |
| JP | 2004-355286 A | 12/2004 |
| JP | 2006-113733 A | 4/2006 |
| JP | 2007-510214 A | 4/2007 |
| JP | 2009-104657 A | 5/2009 |
| JP | 2009-218878 A | 9/2009 |
| JP | 2009-288829 A | 12/2009 |
| KR | 10-2006-0119576 A | 11/2006 |

OTHER PUBLICATIONS

Schedl M. et al, Intelligent structuring and exploration of digital music collections, Elektrotechnik und Informationstechnik Springer-Verlag Austria, Jul. 2005, pp. 232-237, vol. 122, No. 7-8, XP002629137.

Amant R. ST. et al, a visual interface to a music database, Internet Citation URL: http://www.csc.ncsu.edu/faculty/stamant/papers/RSA-etal-AVI02.pdf, 2002, abstract, p. 2, p. 4.

* cited by examiner

METHOD FOR SEARCHING CONTENT

PRIORITY

This application claims the benefit under 35 U.S.C. §119 (a) of a Korean patent application filed in the Korean Industrial Property Office on Dec. 23, 2009, and assigned Serial No. 10-2009-0129923, the entire disclosure of which is hereby incorporated by reference.

BACKGROUND OF THE INVENTION

1. Field of the Invention

The present invention relates to a method for searching for contents. More particularly, the present invention relates to a content searching method for enabling a user to directly search for desired contents.

2. Description of the Related Art

In a general mobile device, e.g. a mobile telephone, a Personal Digital Assistant (PDA), and a computer, a searching method utilizing a database and a searching method using a file list are used to search for contents.

FIGS. 1A and 1B are block diagrams explaining conventional methods for searching for contents, wherein FIG. 1A illustrates the searching method utilizing a database, and FIG. 1B illustrates the searching method using a file list.

Both the searching method utilizing the database and the searching method using the file list use a searching scheme that employs a tree structure having an upper-and-lower subordinate concept.

However, since the searching methods, as described above, require a large number of searching steps until the search has been completed, it is necessary to pass through a large number of handing steps in order to search for a content desired by the user, which is inconvenient to the user.

SUMMARY OF THE INVENTION

An aspect of the present invention is to address at least the above-mentioned problems and/or disadvantages and to provide at least the advantages described below. Accordingly, an aspect of the present invention is to provide a content searching method for enabling the user to directly search for a desired content.

In accordance with an aspect of the present invention, a method for searching contents is provided. The method includes: displaying a location of a cell including a content being executed in a distribution map, which displays a plurality of cells divided according to a distribution axis, and when a search button is input, redistributing and displaying a location of the cell including the content being executed in a distribution map, which displays a plurality of cells in a changed skin screen depending on a distribution axis having a changed keyword.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1A:
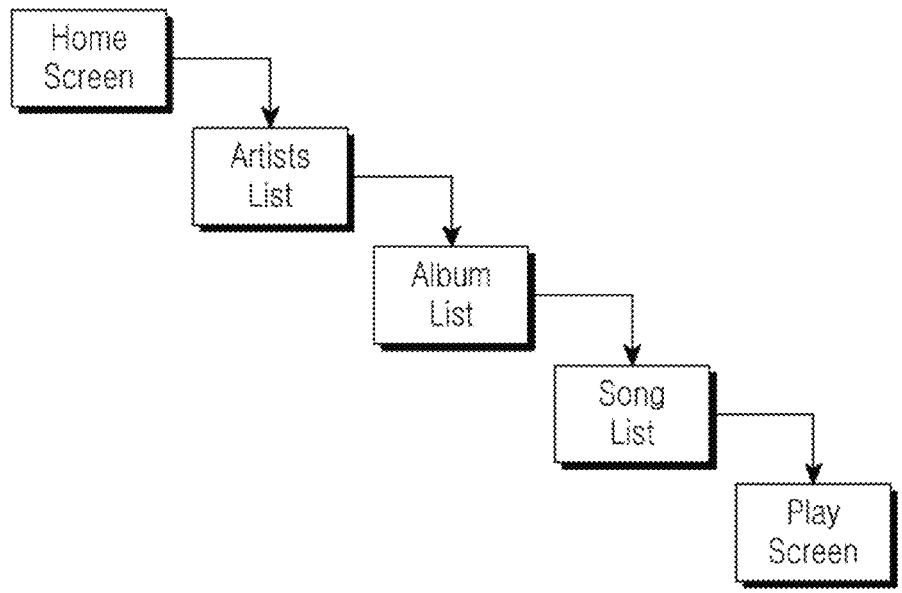
FIGS. 1A and 1B are block diagrams explaining conventional methods for searching contents.
Figure 1B:
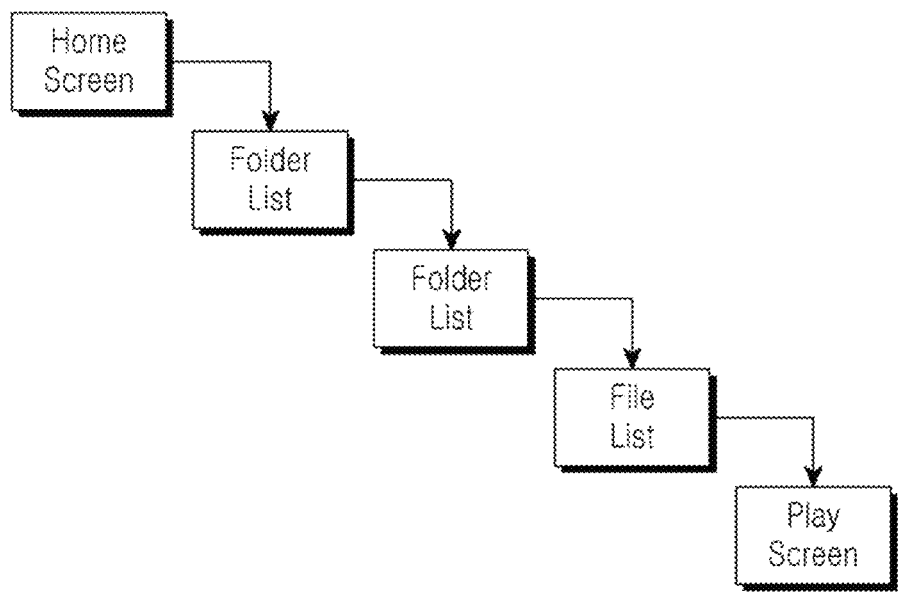

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "content" used in the present embodiment represents all data, including music data, phonebook data, photograph data, moving picture data, etc. which is stored in a mobile device and can be searched for by the user.

According to an exemplary embodiment of the present invention, in a distribution map displaying a plurality of cells divided according to a combination of keywords of distribution axes which include at least two axes, the location of a cell including a content being currently executed is displayed with a corresponding image. In this case, the corresponding image displayed in the cell is an image representing the content included in the cell, and may be an album jacket image when the content being executed is music data, a thumbnail image of photograph data stored corresponding to a corresponding telephone number when the content being executed is phonebook data, a thumbnail image of photograph data when the content being executed is the photograph data, or a thumbnail image of a still image of a first frame when the content being executed is moving picture data.

Also, each of a plurality of cells divided by a combination of the keywords of the distribution axes may include one content or a plurality of contents, or may not include any content. In addition, each cell may be displayed in various shapes, such as a hexagonal shape, a quadrangular shape, a circular shape, etc.

Also, the size and number of cells displayed in the distribution map may be varied and displayed depending on the number of contents corresponding to a combination of the keywords of the distribution axes in each corresponding area divided by the distribution axes. For example, a distribution map divided by distribution axes having two axes, e.g. an X axis and a Y axis, may be partitioned into four areas. In this case, when a total of 50 contents are distributed and displayed in the four areas according to a combination of keywords of the distribution axes, the size and number of cells displayed in each area may vary depending on the number of corresponding contents.

The distribution axes may be configured with an X axis and a Y axis to two-dimensionally display the plurality of cells in the distribution map, or may be configured with an X axis, a Y axis, and a Z axis to three-dimensionally display the plurality of cells in the distribution map. Also, the distribution axes further include a predefined axis for representing the use frequency of the user, in addition to the X and Y axes or the X, Y, and Z axes. Also, the use frequency of the user may be expressed with specified colors with respect to a plurality of cells displayed in the distribution map.

The keywords of the distribution axes may be set in advance, or may be set by the user.

Also, according to the types of keywords of the distribution axes, each keyword has an absolute value or a relative value, wherein the center of a distribution axis having a keyword of the relative value is located at the center at all times, and the center of a distribution axis having a keyword of the absolute value may vary through a change by a pointer.

In the present exemplary embodiment, there may be distribution maps having distribution axes of different keywords, wherein the distribution maps having distribution axes of different keywords may display a plurality of cells in mutually different Graphical User Interface (GUI) skin screens, respectively. In this case, whenever a predefined button is input by the user, a distribution map displaying a plurality of cells in a GUI skin screen which is changed depending on distribution axes having changed keywords is displayed.

Also, whenever a predefined button is input by the user or automatically at every predefined time period, a three-dimensional image having a plurality of surfaces may be rotated to display a distribution map having a separate GUI skin which is included in each surface of the three-dimensional image, thereby providing a visual effect.

Also, the distribution maps having the respective separate GUI skins have distribution axes of different keywords, so that the location of a cell including a content being currently executed is displayed with a corresponding image in different positions depending on the distribution maps.

In the present exemplary embodiment, a cell including a content being currently executed in a distribution map may include a plurality of contents. In the case where the cell includes a plurality of contents, when the cell is input (e.g., touched) for a long time, the plurality of contents may be displayed with corresponding images of a plurality of cells. In this case, the corresponding images of the plurality of cells are disposed and displayed in neighboring cells, centering around the cell including the content being currently executed. In this case, the corresponding images of the plurality of cells may be spread and displayed in a regular sequence according to the keywords of the distribution axes displayed in the distribution map. The plurality of cells may be temporarily or continuously enlarged and displayed. Also, when the cell including the content being currently executed is again input within a predefined time period after the plurality of cells are displayed, the corresponding images of the plurality of cells may be made to disappear.

Also, when a predefined cell among the plurality of cells displayed with the corresponding images is selected, a content included in the selected cell is executed. When two or more cells among the plurality of cells are selected, contents included in the selected cells are executed in a selected order. In this case, when a predefined cell is input twice during a predefined time period, it may be determined to be an execution command, and thus a corresponding content may be executed. Also, when the content is executed, the screen of a display unit may be shifted from a distribution map screen to an execution-mode screen.

In addition, when a pointer is input to a predefined cell among the plurality of cells displayed with the corresponding images, and then moves to a cell located at a certain position, the overall corresponding images of the plurality of cells move as a group, and are displayed in and around the position of the cell to which the pointer has moved. According to the position of the cell to which the pointer has moved, a corresponding image of a cell, besides the plurality of cells which have moved and are displayed as a group, may be additionally displayed, and/or the corresponding image of a cell among the plurality of cells may not be displayed.

When a cell including a content being currently executed is input for a short time in the distribution map, information on the cell, for example, information on the title and singer of a song when the content is music data, information on recently stored data when the content is phonebook data, and a title and so on when the content is a photograph image or moving picture data, may be displayed in a position near the cell. The information on the cell may be set by the user. Also, the information on the cell may be displayed on a top menu bar of the screen, and a representative song may be displayed when the content is music data.

The functions performed according to input time periods for the cell is not limited to the exemplary embodiment of the present invention described herein, and may be changed.

When a certain cell is selected and input for a short time in the distribution map, a corresponding image of the certain cell and information on the certain cell may be displayed, wherein the information on the certain cell may be displayed in a position near the certain cell. Therefore, when the certain cell includes no content, information, such as "No Memory," may be displayed as the information on the certain cell. Also, the information on the certain cell may be displayed on a top menu bar of the screen.

In addition, when a plurality of certain cells are selected and input for a short time, and then an execution is selected, the plurality of certain cells may be executed in a selected order. The execution may be performed when a predefined cell among the plurality of cells is input twice during a predefined time period.

When the certain cell is selected and input for a long time in the distribution map, the certain cell and neighboring cells of the certain cell may be displayed with corresponding images. In this case, corresponding images of the certain cell and neighboring cells are positioned and displayed in the locations of the neighboring cells, centering around the certain cell, wherein the corresponding images of the certain cell and neighboring cells may be spread and displayed in regular sequence according to keywords of the distribution axes displayed in the distribution map.

The certain cell and neighboring cells are temporarily or continuously enlarged and displayed. Also, when the certain cell is again input within a predefined time period after the certain cell and neighboring cells are displayed, the corresponding images of the neighboring cell may be made to disappear.

In addition, when a predefined cell among the certain cell and neighboring cells is input twice during a predefined time period, it is determined to be an execution command, and thus a content included in the selected cell is executed. When two or more cells among the plurality of cells are selected, contents included in the selected cells are executed in a selected order. When the content is executed, a screen in a display unit may be shifted from a distribution map screen to an execution-mode screen.

Also, when a pointer is input to a predefined cell among the certain cell and neighboring cells, and then moves to a cell located at a certain position, the overall corresponding images of the certain cell and neighboring cells move as a group and then are displayed in the position of the cell to which the pointer has moved.

According to the position to which the pointer has moved, a corresponding image of a cell, besides the certain cell and neighboring cells which have moved as a group and have been displayed, may be additionally displayed, or the corresponding image of a cell among the certain cell and neighboring cells may not be displayed.

When the certain cell is selected and input twice in a short time during a predefined time period in the distribution map, a content included in the certain cell is executed, wherein, when the content is executed, a screen of a display unit may be shifted from a distribution map screen to an execution-mode screen.

Also, when the certain cell includes a plurality of contents, a first content or a content set as a default may be executed, or a content selected by the user may be executed.

An exemplary embodiment of the present invention configured as described above will now be described in more detail with reference to FIGS. 2A, 2B, 3 and 4. FIGS. 2A, 2B, 3 and 4 illustrate contents relating to music data among a plurality of contents stored in a mobile device, and the following description will be given on an example where distribution axes displayed in a distribution map are configured with an X axis and a Y axis.

Figure 2A:
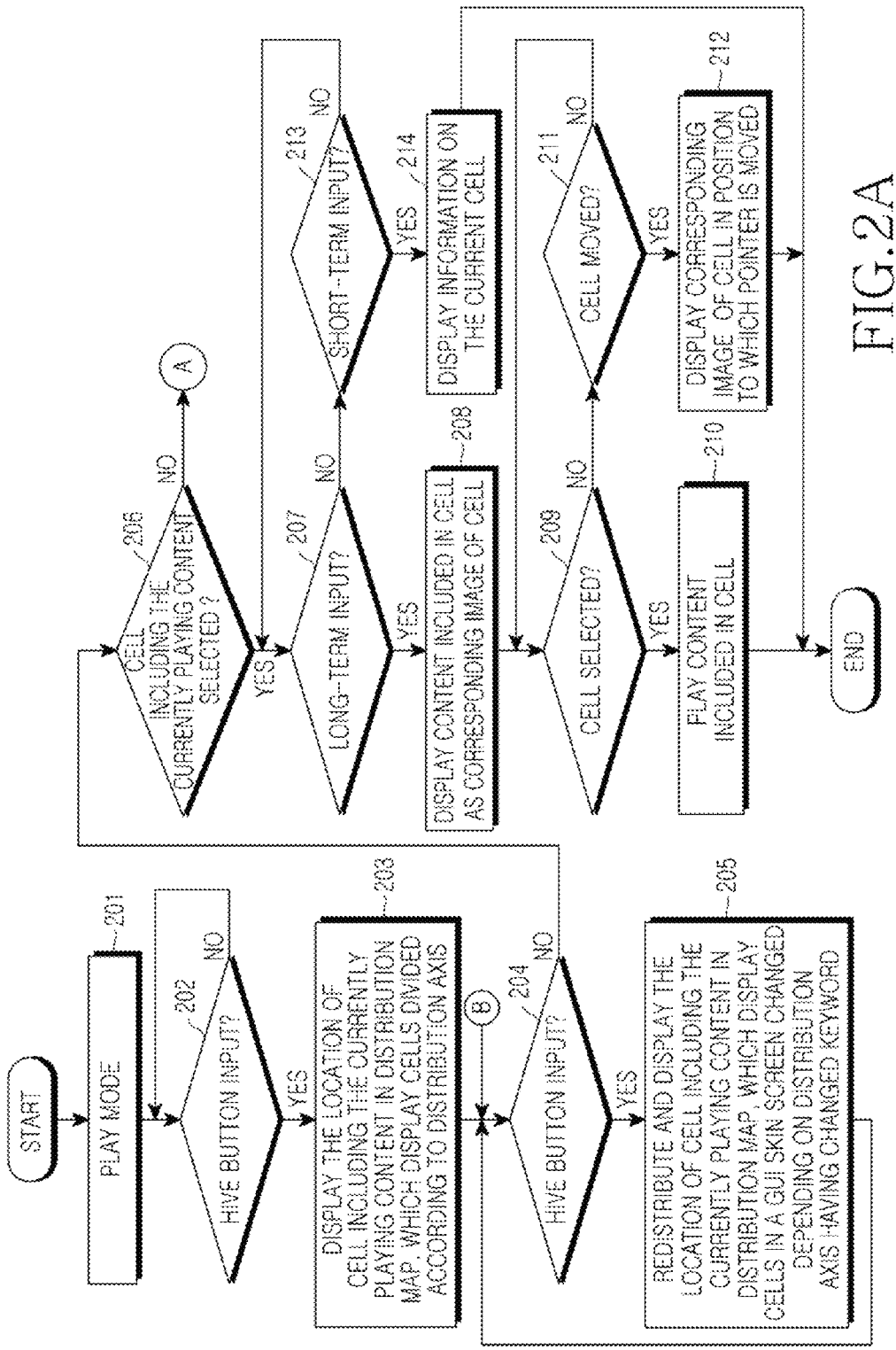
FIGS. 2A and 2B are flowcharts explaining a content searching procedure according to an exemplary embodiment of the present invention.
Figure 2B:
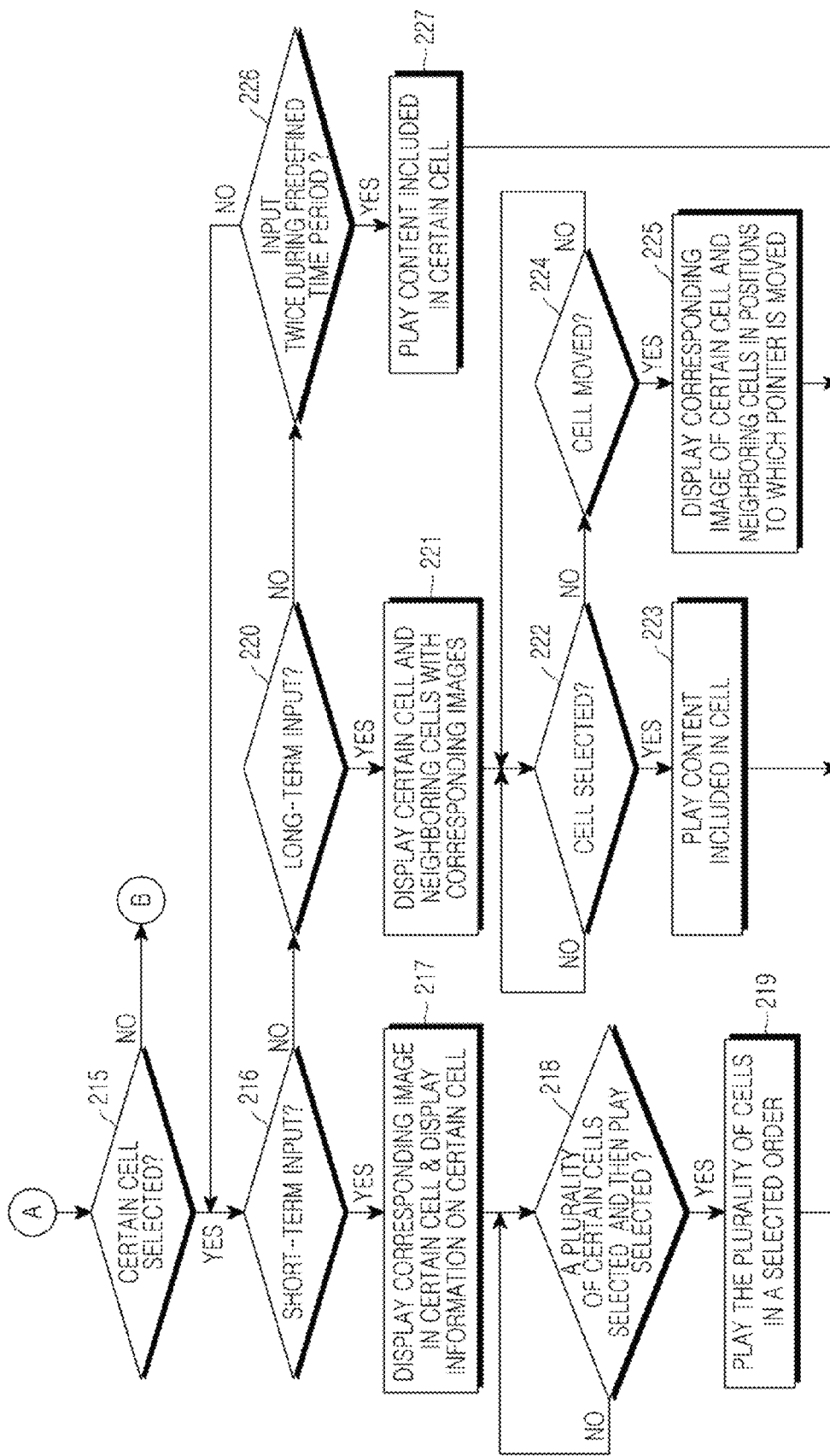

FIGS. 2A and 2B are flowcharts explaining a content searching procedure according to an exemplary embodiment of the present invention, FIGS. 3A-3E are views explaining the location of a cell including a currently playing content, and a process in which the location of the cell including the currently playing content is changed depending on a change of a distribution axis in the distribution map in relation to FIG. 2A. FIGS. 4A-4F are views explaining a process of displaying and playing a cell which is selected from a distribution map in relation to FIG. 2B.

Referring to FIG. 2A, in step 201 a mobile device is in a play mode where the mobile device is playing a content A1. While in the play mode in step 201, a controller (not shown) in the mobile device detects, in step 202, if a Hive button included in the mobile device is input (e.g., touched) and proceeds to step 203, where the controller displays the location of the currently playing content A1 in a distribution map.

In step 203, in a distribution map, which is partitioned into four areas based on distribution axes including the X and Y axes with the keywords, and displays a plurality of cells included in each area according to a combination of the keywords, the controller displays the location of the cell including the currently playing content A1 with a corresponding image. In this case, the corresponding image may be a jacket image of an album including the currently playing content A1.

In step 204, the controller detects if the Hive button is input again. If the controller detects that the Hive button has been input, the controller, in step 205, displays the location of the cell including the currently playing content A1 with a corresponding image in a distribution map, which displays a plurality of cells with a new GUI skin screen and distribution axes having changed keywords.

Whenever the Hive button is input, the controller displays a distribution map which displays a plurality of cells with a new GUI skin screen and distribution axes having different keywords, and displays the location of the cell including the playing content A1, which is changed depending on the different keywords in the distribution map, with a corresponding image.

Also, the controller may provide the user with a visual effect in such a manner as to rotate a three-dimensional image, which has a plurality of corresponding distribution maps on the surfaces thereof, respectively, so as to display a corresponding distribution map whenever the Hive button is input.

In the course of displaying the location of the cell including the currently playing content A1 with a corresponding image in a distribution map, as described in step 203 or 205, when the cell including the currently playing content A1 is selected, the controller detects it, and may display information on the content A1 included in the cell, e.g., information on the title and singer of a corresponding song, in a position near the cell.

Figures 3A, 3B, 3C, 3D, 3E:
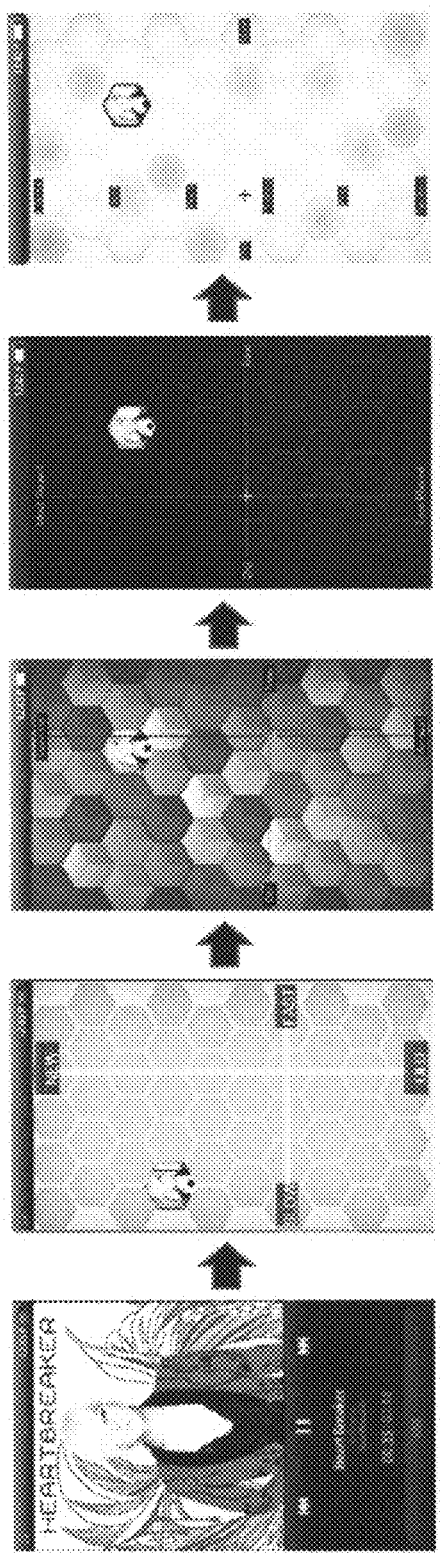
FIGS. 3A-3E are views explaining the location of a cell including a currently playing content, and a process in which the location of the cell including the currently playing content is changed depending on a change of a distribution axis in the distribution map in relation to FIG. 2A according to an exemplary embodiment of the present invention.

The steps 201-205 will now be described with reference to FIGS. 3A-3E. FIG. 3A corresponds to step 201 of playing a corresponding content in a play mode. FIG. 3B corresponds to step 203, in which, when a Hive button is input in a state shown in FIG. 3A, the location of a cell including the currently playing content is displayed with a corresponding album jacket image in a distribution map, which displays a plurality of cells divided based on distribution axes.

FIGS. 3C-3E correspond to step 205, in which, whenever the Hive button is input in the state shown in FIG. 3B, the location of the cell including the currently playing content, which is changed depending on different keywords, is displayed with a corresponding album jacket image in a distribution map, which displays a plurality of cells with a new GUI skin screen and distribution axes having the different keywords.

In the course of displaying the location of a cell including the currently playing content A1 with a corresponding image in a distribution map, as described in step 203 or 205, when the cell is selected, the controller detects it in step 206, and determines a time period during which the cell is input (e.g., touched).

While the cell including the currently playing content A1 is being selected, the content A1 may be continuously maintained in the play mode.

When the time period during which the cell is input is equal to or longer than a predefined time period, the controller detects it in step 207, and proceeds to step 208, where the controller displays at least one content A1 to Az included in the cell as a corresponding image of at least one cell.

In step 208, the controller displays information representing that only the currently playing content exists in the cell when the cell includes only the currently playing content A1, and displays corresponding images in a plurality of cells corresponding to a plurality of contents A1 to An when the cell includes the plurality of contents A1 to An.

The corresponding images of the plurality of cells corresponding to the plurality of contents A1 and An may be images which are selected from album jacket images and enable the plurality of contents to be distinguished from each other, or may be album jacket images in which information on each corresponding content, e.g., information on the title and singer of each song, is recorded.

Also, when displaying the corresponding images in the plurality of cells corresponding to the plurality of contents A1 to An, the controller disposes and displays the corresponding images of the plurality of cells in neighboring cells, centering around the cell including the currently playing content A1. In this case, the corresponding images of the plurality of cells are spread and displayed in a regular sequence according to keywords of the distribution axes displayed in the distribution map. In this case, the plurality of cells may be temporarily or continuously enlarged and displayed. Also, when the cell including the currently playing content A1 is again input within a predefined time period after the plurality of cells are displayed, the controller may make the corresponding images of the plurality of cells disappear.

In the course of displaying the corresponding image in the plurality of cells in step 208, when a predefined cell is selected twice during a predefined time period, the controller detects it in step 209, and proceeds to step 210, where the controller plays a content included in the selected cell. In step 210, when playing the content included in the selected cell, the mobile device may shift to the play mode and display information representing that the content is being played.

Also, in the course of displaying the corresponding images in the plurality of cells in step 208, when a pointer is input to a predefined cell and then moves to a cell located at a certain position, the controller detects it in step 211, and proceeds to step 212, where the controller moves the overall corresponding images of the plurality of cells as a group, and displays the corresponding images of the plurality of cells in and around the position of the cell to which the pointer has moved.

In step 212, according to the position of the cell to which the pointer has moved, the controller may additionally display corresponding images in cells, besides the plurality of cells which are moved as a group and are displayed, and/or may not display the corresponding images of one or more cells among the plurality of cells.

In the course of displaying the location of the cell including the currently playing content A1 with a corresponding image in the distribution map, as described in step 203 or 205, when the cell is input (e.g., touched) for a time period shorter than the predefined time period, the controller senses it in step 213, and proceeds to step 214, where the controller displays information on the cell including the playing content A1, e.g., information on the title and singer of a corresponding song, in a position near the cell including the playing content A1. Also, the controller may separately display a representative song among contents of an album included in the cell, on a top menu bar of the screen.

In the course of displaying the location of the cell including the playing content A1 with the corresponding image in the distribution map, as described in step 203 or 205, when a certain cell is selected, the controller detects it in step 215 and determines a time period during which the certain cell is input.

While the certain cell is selected, the corresponding image of the cell including the content A1 may disappear, and the play mode for the content A1 may be continuously maintained. Otherwise, while the certain cell is selected, the corresponding image of the cell including the content A1 may disappear, and the play mode for the content A1 may be terminated.

When the certain cell is input (e.g., touched) for a time period shorter than a predefined time period, the controller detects it in step 216, and may display a corresponding album jacket image of the certain cell in the certain cell, and display information on the certain cell, e.g., information on the title and singer of a corresponding song, in a position near the certain cell, in step 217. Also, the controller may display information on the certain cell, e.g. information on a representative song of an album, on the top menu bar of the screen.

When a plurality of certain cells are selected in such a manner that each certain cell is input for a time period shorter than the predefined time, and then a play function is selected, the controller detects it in step 218, and proceeds to step 219, where the controller plays the plurality of certain cells in a selected order. In this case, when the plurality of certain cells are selected, and then a predefined cell among the plurality of certain cells is input twice during a predefined time period, the controller may determine that a play function has been selected.

Also, when the certain cell is input for a time period equal to or longer than the predefined time period, the controller detects it in step 220, and proceeds to step 221, where the controller displays the certain cell and neighboring cells of the certain cell with corresponding images.

In step 221, the controller disposes and displays corresponding images of the certain cell and neighboring cells in the locations of the certain cell and neighboring cells, centering around the certain cell, wherein the controller performs a control operation so that the corresponding images of the certain cell and neighboring cells can be spread and displayed in regular sequence according to keywords of the distribution axes displayed in the distribution map.

Also, in step 221, the controller may temporarily or continuously enlarge and display the certain cell and the neighboring cells. In addition, in step 221, when the cell including the currently playing content is again input within a predefined time period after the corresponding images of the plurality of cells are displayed, the controller may make the corresponding images of the plurality of cells disappear.

In the course of displaying the corresponding images of the certain cell and neighboring cells in step 221, when a predefined cell is input (e.g., touched) twice during a predefined time period, the controller detects it in step 222, and proceeds to step 223, where the controller plays a content included in the selected cell.

In step 223, when playing the content included in the selected cell, the mobile device may shift to the play mode and display information representing that the content is being played.

Also, in the course of displaying the corresponding images of the certain cell and neighboring cells in step 221, when a pointer is input to a predefined cell and then moves to a cell located at a certain position, the controller detects it in step 224, and proceeds to step 225, where the controller moves the overall corresponding images of the certain cell and neighboring cells as a group and displays the corresponding images of the certain cell and neighboring cells in and around the position of the cell to which the pointer has moved.

In step 225, according to the position of the cell to which the pointer has moved, the controller may additionally display the corresponding image of a cell, besides the certain cell and neighboring cells which move as a group and are displayed, and/or may not display the corresponding images of one or more predefined cells among the certain cell and neighboring cells.

Also, when the certain cell is input twice during a predefined time period, the controller detects it in step 226, and proceeds to step 227, where the controller displays a corresponding image in the certain cell and plays a content included in the certain cell.

In step 227, when the certain cell includes a plurality of contents, the controller may play a content set as a default or a first content, or may play a content set by the user. In step 227, when a content included in the certain cell is played, the mobile device may shift to the play mode and display information representing that the content is being played.

Figures 4A, 4B, 4C, 4D, 4E, 4F:
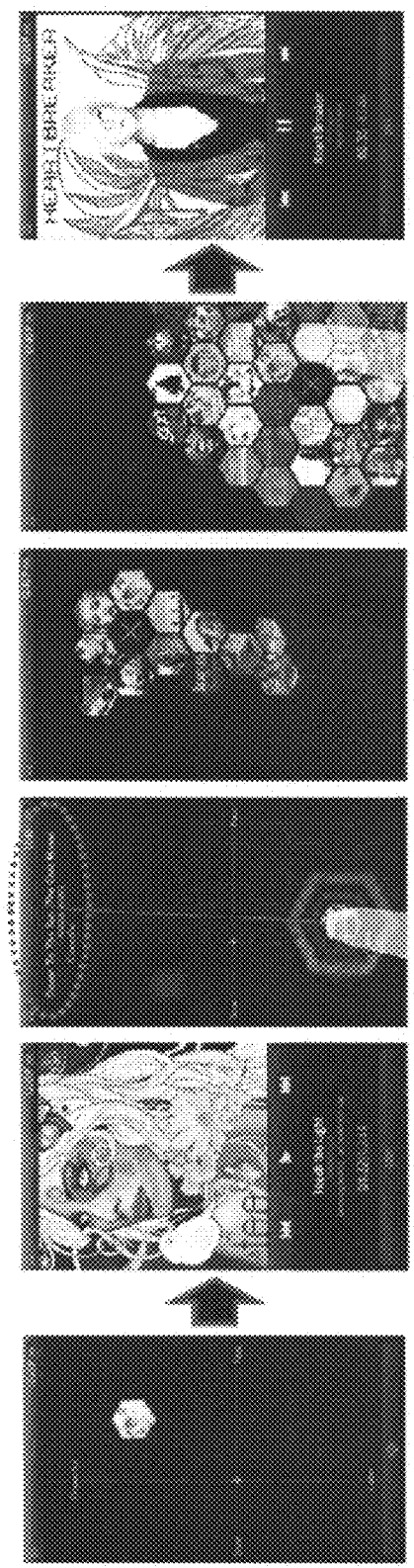
FIGS. 4A-4F are views explaining a process of displaying and playing a certain cell which is selected from a distribution map in relation to FIG. 2B according to an exemplary embodiment of the present invention.

The steps 217, 221, 227 and 223 will now be described with reference to FIGS. 4A-4F. FIG. 4A corresponds to step 217 of displaying a certain cell with a corresponding album jacket image when the certain cell is input for a time period shorter than a predefined time period in a distribution map.

FIG. 4B corresponds to step 227 of shifting to the play mode and playing a content included in a certain cell when the certain cell is input twice during a predefined time period in a state shown in FIG. 4A.

FIG. 4C illustrates a case where information on a certain cell is displayed on a top menu bar of a screen when the certain cell is selected.

FIGS. 4D and 4E correspond to step 221 of displaying the corresponding images of a certain cell and neighboring cells when the certain cell is input for a time period equal to or longer than a predefined time period.

FIG. 4F corresponds to step 223 of shifting to the play mode and playing a content included in a predefined cell when the predefined cell is input twice during a predefined time period in a state shown in FIG. 4D or 4E.

At this point it should be noted that the exemplary embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with searching for and displaying contents in accordance with the exemplary embodiments of the present invention as described above. Alternatively, one or more processors operating in accordance with stored instructions may implement the functions associated with searching for and displaying contents in accordance with the exemplary embodiments of the present invention as described above. If such is the case, it is within the scope of the present disclosure that such instructions may be stored on one or more processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present invention can be easily construed by programmers skilled in the art to which the present invention pertains.

As described above, according to exemplary embodiments of the present invention, since a content search method of enabling the user to directly search for a desired content, the user can play the desired content without passing through many handling steps even in the case where a plurality of contents exist, so that it is possible to provide convenience and pleasure in playing contents.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for searching contents, the method comprising:
   displaying a location of a cell including therein a content being executed in a distribution map, which displays a plurality of cells divided according to a distribution axis based on previously undefined keywords input by a user, the content being executed prior to the displaying of the location of the cell; and
   when a search button is input, redistributing and displaying a location of the cell including the content being executed in a distribution map, which displays a plurality of cells in a changed skin screen depending on a distribution axis having a changed keyword,
   wherein the location of the cell including the content being executed in the distribution map is displayed with a corresponding image with respect to the cell including the content being executed among overall cells.

2. The method as claimed in claim 1, wherein each of the plurality of cells displayed in the distribution map comprises at least one content or comprises no content.

3. The method as claimed in claim 1, wherein, in the plurality of cells divided by the distribution axis, a size and a number of cells included in each area are changed and displayed depending on a number of contents corresponding to a keyword of the distribution axis in the area.

4. The method as claimed in claim 1, wherein the corresponding image comprises at least one of album jacket image when the content being executed is music data, a thumbnail image of photograph data stored corresponding to a corresponding telephone number when the content being executed is phonebook data, a thumbnail image of photograph data when the content being executed is the photograph data, and a thumbnail image of a still image of a first frame when the content being executed is moving picture data.

5. The method as claimed in claim 1, wherein the distribution axis comprises at least two axes, and the plurality of cells are displayed two-dimensionally or three-dimensionally through the at least two axes.

6. The method as claimed in claim 1, further comprising:
   when the cell including the content being executed is selected in the distribution map, determining a time period during which the cell is input;
   when the cell is input for a long time, displaying at least one content included in the cell as a corresponding image of at least one cell, which is equal in number to the at least one content;
   when a predefined cell moves to another location while the corresponding image of the at least one cell is being displayed, moving the at least one cell and displaying a corresponding image; and
   when a cell is selected from among the at least one displayed cell, executing a content included in the selected cell.

7. The method as claimed in claim 6, wherein, when the cell including the content being executed is input for a long time, the corresponding images of the at least one cell are rearranged and displayed in neighboring cells, centering around the cell including the content being executed, wherein the corresponding image of the at least one cell is displayed in regular sequence according to a keyword of the distribution axis displayed in the distribution map.

8. The method as claimed in claim 6, wherein the executing of the content further comprises, if the at least one cell comprises a plurality of cells, when a plurality of cells is selected from among the at least one cell, executing the plurality of selected cells in a selected order.

9. The method as claimed in claim 6, further comprising displaying information on the cell including the content being executed when the cell is input for a short time.

10. The method as claimed in claim 1, further comprising:
determining a time period during which a certain cell is input when the certain cell is selected in the distribution map;
displaying information on the certain cell when the certain cell is input for a short time;
displaying corresponding images of the certain cell and neighboring cells of the certain cell when the certain cell is input for a long time; and
executing a content included in the certain cell when the certain cell is input twice during a predefined time period.

11. The method as claimed in claim 10, wherein a corresponding image of the certain cell is displayed when the certain cell is selected.

12. The method as claimed in claim 10, further comprising, when a plurality of cells including the certain cell are selected and then an execution is selected, executing the plurality of selected cells in a selected order.

13. The method as claimed in claim 10, wherein, when the certain cell is input for a long time, the corresponding images of the certain cell and the neighboring cells are rearranged and displayed in neighboring cells, centering around the location of the certain cell, wherein the corresponding images of the certain cell and the neighboring cells are displayed in regular sequence according to a keyword of the distribution axis displayed in the distribution map.

14. The method as claimed in claim 13, wherein the certain cell and the neighboring cells displayed with the corresponding images are temporarily or continuously enlarged and displayed.

15. The method as claimed in claim 10, further comprising, when a predefined cell is selected while the certain cell and the neighboring cells of the certain cell are being displayed, executing a content included in the selected cell.

16. The method as claimed in claim 1, wherein the location of the cell including the content being executed is displayed in the distribution map when the search button is input during a play mode in which the content is being executed.

17. The method as claimed in claim 1, wherein the content includes at least one of music data, phonebook data, photograph data, and moving picture data.

18. The method as claimed in claim 1, wherein a shape of each cell displayed in the distribution map includes one of a hexagonal shape, a quadrangular shape, and a circular shape.

19. At least one non-transitory processor readable medium for storing a computer program of instructions configured to be readable by at least one processor for instructing the at least one processor to execute a computer process for performing the method as recited in claim 1.

20. The method as claimed in claim 1, wherein the corresponding image display with respect to the cell including the content being executed is the only image displayed among the overall cells.

\* \* \* \* \*